United States Patent
Saari et al.

(10) Patent No.: US 9,251,404 B2
(45) Date of Patent: Feb. 2, 2016

(54) NAME BUBBLE HANDLING (71) Applicant: NOKIA CORPORATION, Espoo (FI)

(72) Inventors: Marko Juhani Saari, Espoo (FI); Adele Asuncion Valerio Simula, Helsinki (FI); Saija Maria Lehto, Helsinki (FI); Sami Pekka Laakso, Masala (FI); Petru Motrescu, Helsinki (FI); Antti Klemetti, Helsinki (FI); Timo-Pekka Olavi Viljamaa, Helsinki (FI); Jari-Jukka Heikkila, Helsinki (FI)

(73) Assignee: Nokia Corporation, Espoo (FI)

( * ) Notice: Subject to any disclaimer, the term of this patent is extended or adjusted under 35 U.S.C. 154(b) by 70 days.

(21) Appl. No.: 14/360,617

(22) PCT Filed: Nov. 23, 2012

(86) PCT No.: PCT/EP2012/073482
§ 371 (c)(1),
(2) Date: May 24, 2014

(87) PCT Pub. No.: WO2013/076252
PCT Pub. Date: May 30, 2013

(65) Prior Publication Data
US 2015/0347824 A1 Dec. 3, 2015

(30) Foreign Application Priority Data
Nov. 25, 2011 (GB) .................................. 1120373.4

(51) Int. Cl.
*G06K 9/00* (2006.01)
*G06F 17/30* (2006.01)
(Continued)

(52) U.S. Cl.
CPC ...... *G06K 9/00288* (2013.01); *G06F 17/30256* (2013.01); *G06T 7/004* (2013.01);
(Continued)

(58) Field of Classification Search
USPC ................. 382/115, 118, 209, 219, 278, 282; 340/5.81, 5.82, 5.83
See application file for complete search history.

(56) References Cited

U.S. PATENT DOCUMENTS 6,434,604 B1   8/2002 Harada et al.
6,919,892 B1 *  7/2005 Cheiky .................... G06T 13/40
                                                    345/473
(Continued)

FOREIGN PATENT DOCUMENTS

WO   2011007216 A1   1/2011

OTHER PUBLICATIONS

Bong-Kyung Chun et al., "An Automated Procedure for Word Balloon Placement in Cinema Comics", Advances in Visual Computing. Second International Symposium, ISVC 2006. Proceedings, Part II (Lecture Notes in Computer Science, vol. 4292) Springer-Verlag Berlin, Germany, 2006, pp. 576-585.
(Continued)

*Primary Examiner* — Yosef Kassa
(74) *Attorney, Agent, or Firm* — Harrington & Smith (57) ABSTRACT

Apparatus has at least one processor and at least one memory having computer-readable code stored therein which when executed controls the at least one processor: to determine a name relating to a face in an image; to calculate a first maximum length attribute for a name bubble for the face at a first zoom level; to select a part of the name for inclusion in the name bubble having regard to the first maximum length attribute; to calculate a second maximum length attribute for the name bubble for the face at a second zoom level, the first and second zoom levels being different and the first and second maximum length attributes being different; and to select a part of the name for inclusion in the name bubble for the face at the second zoom level having regard to the second maximum length attribute.

19 Claims, 6 Drawing Sheets

(51) Int. Cl.
  *G06T 11/60* (2006.01)
  *G06T 7/00* (2006.01)
  *G06T 11/00* (2006.01)

(52) U.S. Cl.
  CPC .............. *G06T 11/001* (2013.01); *G06T 11/60* (2013.01); *G06T 2207/10004* (2013.01); *G06T 2207/30201* (2013.01)

(56) References Cited

U.S. PATENT DOCUMENTS

| | | | | |
|---|---|---|---|---|
| 6,964,023 B2* | 11/2005 | Maes | ................... | G06F 3/0481 |
| | | | | 704/E15.041 |
| 7,694,885 B1 | 4/2010 | Bourdev | | |
| 7,761,000 B2* | 7/2010 | Nakajima | ................ | G03B 3/00 |
| | | | | 396/104 |
| 8,208,764 B2* | 6/2012 | Guckenberger | .. | G06F 17/30247 |
| | | | | 345/156 |
| 8,456,308 B2* | 6/2013 | Nelson | ................... | G08B 21/18 |
| | | | | 340/5.3 |
| 8,543,573 B2* | 9/2013 | MacPherson | ............ | G06N 5/02 |
| | | | | 707/736 |
| 8,553,037 B2* | 10/2013 | Smith | ..................... | G06T 13/40 |
| | | | | 345/473 |
| 2010/0079623 A1 | 4/2010 | Tomita | | |
| 2010/0162138 A1 | 6/2010 | Pascal et al. | | |
| 2010/0219936 A1 | 9/2010 | Gabara | | |
| 2011/0044512 A1 | 2/2011 | Bambha et al. | | |
| 2011/0199511 A1 | 8/2011 | Takahashi et al. | | |

OTHER PUBLICATIONS

International Search Report and Written Opinion of the International Searching Authority for corresponding PCT/EP2012/073482, issued Apr. 2, 2013, 12 pages.

Sony Technology, "Face Recognition Technology", dated Nov. 14, 2011, 5 pages.

United Kingdom Search Report from corresponding GB Application No. 1120373.4, issued Mar. 20, 2012, 3 pages.

* cited by examiner

NAME BUBBLE HANDLING

RELATED APPLICATION

This application was originally filed as Patent Cooperation Treaty Application No. PCT/EP2012/073482 filed Nov. 23, 2012, which claims priority benefit to United Kingdom Patent Application No. 1120373.4, filed Nov. 25, 2011, both of which the entireties are incorporated herein by reference.

FIELD OF THE INVENTION

This invention relates to methods and apparatus for name bubble handling.

BACKGROUND TO THE INVENTION

It is known for people in digital photographs to be "tagged". A tag provides a link between a part of a photograph and a person. For instance, social networking services are known to provide a facility whereby users can upload digital photos, for storage in a gallery associated with the user's profile. Where these photographs include images of their friends, family and other contacts, these other people can be tagged such that users of the social networking service can follow links from the people that are tagged in the photograph to the photograph itself.

Separately, it is known for photograph handling software applications to feature facial recognition, by which faces within a photograph can be identified and a guess taken as to the identity of the individual whom is imaged.

Pocket-sized mobile devices tend to include displays of relatively limited size. Mobile telephones, smartphones and personal digital assistants, for instance, tend to have a diagonal screen size of less than 5 inches (12.7 centimeters), and often less than 4 inches (10.16 centimeters). To allow text to be sufficiently easily readable, it is usually displayed with a certain minimum text height. The display of text overlaid on images can be to the detriment of the user experience, particularly on pocket-sized handheld devices. This can be ameliorated by reducing the size of text, although reducing text size can be detrimental to user experience in a different way.

It is within this context that the present invention was made.

SUMMARY OF THE INVENTION

A first aspect of the invention provides apparatus, the apparatus having at least one processor and at least one memory having computer-readable code stored therein which when executed controls the at least one processor:
  to determine a name relating to a face in an image;
  to calculate a first maximum length attribute for a name bubble for the face at a first zoom level;
  to select a part of the name for inclusion in the name bubble having regard to the first maximum length attribute;
  to calculate a second maximum length attribute for the name bubble for the face at a second zoom level, the first and second zoom levels being different and the first and second maximum length attributes being different; and
  to select a part of the name for inclusion in the name bubble for the face at the second zoom level having regard to the second maximum length attribute.

The name may comprise a family name component comprising one or more whole words and a given name component comprising one or more whole words and the computer-readable code when executed may control the at least one processor to perform selecting a part of the name for inclusion in the name bubble comprises selecting the given name component of the name for inclusion in the name bubble in response to determining that the maximum length attribute for the name bubble at a given zoom level is less than a length of the sum of the given name component and the family name component of the name and is greater than or equal to a length of the given name component of the name.

The computer-readable code when executed may control the at least one processor to perform selecting a part of the name for inclusion in the name bubble comprises selecting initials of the name to the exclusion of other components of the name for inclusion in the name bubble in response to determining that the maximum length attribute for the name bubble at a given zoom level is less than a length of the given name component of the name.

The computer-readable code when executed may control the at least one processor to perform selecting a part of the name for inclusion in the name bubble comprises selecting a whole of the name for inclusion in the name bubble in response to determining that the maximum length attribute for the name bubble at a given zoom level is greater than or equal to a length of the whole of the name.

The computer-readable code when executed may control the at least one processor to perform setting a height of the name bubble at the same height for every zoom level for which a name bubble is provided.

The computer-readable code when executed may control the at least one processor to perform refraining from providing a name bubble for the face when a current zoom level is a minimum zoom level.

The computer-readable code when executed may control the at least one processor to perform calculating a maximum length attribute for a name bubble by determining a size parameter of the face at a given zoom level and setting the maximum length attribute for that zoom level dependent on the determined size parameter.

The computer-readable code when executed may control the at least one processor to perform determining a first name relating to the face by using face recognition to identify a best match in a database of faces. The computer-readable code when executed may control the at least one processor to perform responding to a user input selecting a name bubble by providing an interface by which a user can confirm or set a name for the face. Alternatively or in addition, the computer-readable code when executed may control the at least one processor to perform setting a visual attribute for a name bubble relating to a name that is determined by face recognition software to be a likely match to a first value and setting the visual attribute for a name bubble relating to a name that is confirmed or set by a user to a second value. Here, the visual attribute may be name bubble colour.

The computer-readable code when executed may control the at least one processor to perform setting a location for the name bubble on the image relative to the face including enforcing a minimum separation between the name bubble and screen elements that are not part of the image.

The computer-readable code when executed may control the at least one processor to perform:
  determining a second name relating to a second face in the image;
  calculating a first maximum length attribute for a second name bubble for the second face at the first zoom level;
  selecting a part of the second name for inclusion in the second name bubble for the second face at the first zoom level having regard to the first maximum length attribute for the second name bubble;

calculating a second maximum length attribute for the second name bubble for the second face at the second zoom level, the first and second maximum length attributes for the second name bubble being different; and selecting a part of the second name for inclusion in the second name bubble for the second face at the second zoom level having regard to the second maximum length attribute for the second name bubble.

The computer-readable code when executed may control the at least one processor to perform causing display of the image with the selected part of the name in the name bubble.

The computer-readable code when executed may control the at least one processor to perform causing display of the name bubble with a plain background.

A second aspect of the invention provides a computer-implemented method comprising:

determining a name relating to a face in an image;

calculating a first maximum length attribute for a name bubble for the face at a first zoom level;

selecting a part of the name for inclusion in the name bubble having regard to the first maximum length attribute;

calculating a second maximum length attribute for the name bubble for the face at a second zoom level, the first and second zoom levels being different and the first and second maximum length attributes being different; and selecting a part of the name for inclusion in the name bubble for the face at the second zoom level having regard to the second maximum length attribute.

A third aspect of the invention provides a computer program comprising instructions that when executed by computer apparatus control it to perform the method.

A fourth aspect of the invention provides apparatus comprising:

means for determining a name relating to a face in an image;

means for calculating a first maximum length attribute for a name bubble for the face at a first zoom level;

means for selecting a part of the name for inclusion in the name bubble having regard to the first maximum length attribute;

means for calculating a second maximum length attribute for the name bubble for the face at a second zoom level, the first and second zoom levels being different and the first and second maximum length attributes being different; and means for selecting a part of the name for inclusion in the name bubble for the face at the second zoom level having regard to the second maximum length attribute.

A fifth aspect of the invention provides a non-transitory computer-readable storage medium having stored thereon computer-readable code, which, when executed by computing apparatus, causes the computing apparatus to perform a method comprising:

determining a name relating to a face in an image;

calculating a first maximum length attribute for a name bubble for the face at a first zoom level;

selecting a part of the name for inclusion in the name bubble having regard to the first maximum length attribute;

calculating a second maximum length attribute for the name bubble for the face at a second zoom level, the first and second zoom levels being different and the first and second maximum length attributes being different; and selecting a part of the name for inclusion in the name bubble for the face at the second zoom level having regard to the second maximum length attribute.

BRIEF DESCRIPTION OF THE DRAWINGS

Embodiments of the present invention will now be described, by way of example only, with reference to the accompanying drawings, in which.

DETAILED DESCRIPTION OF EMBODIMENTS

Embodiments of the invention can be said to provide dynamic name bubbles. The name bubbles are dynamic in that their size is determined having regard to a size of a face with which they are to be displayed, and that the size of the face is dependent on a zoom level. As such, the size of the name bubble can be said to be appropriate having regard to the proportion of the display that is occupied by the associated face. A smaller face is related to a smaller name bubble, and a larger face is related to a larger name bubble. Moreover, the selection of the whole or part of the name having regard to the maximum name bubble length means that the user is provided with information that is useful to allow them to determine the name of the contact that is known or thought to be known by the terminal as the name for the face that is included in the image. Advantageously, this is achieved without the need to use a font size that is smaller than a font size that has been deemed to be appropriate, either as a default font size or as a font size that has been set by a user.

Below-described rules for the selection of a part of a name for including in a name bubble are considered to be optimal in indicating to a user of the terminal a known or assumed name of a contact when it would be detrimental to the user experience to display the whole of the name of the contact. Put concisely, features of the embodiments of the invention cooperate to provide information that is likely to be of interest to a user but without negatively impacting viewing of images in a significant way.

Figure 1:
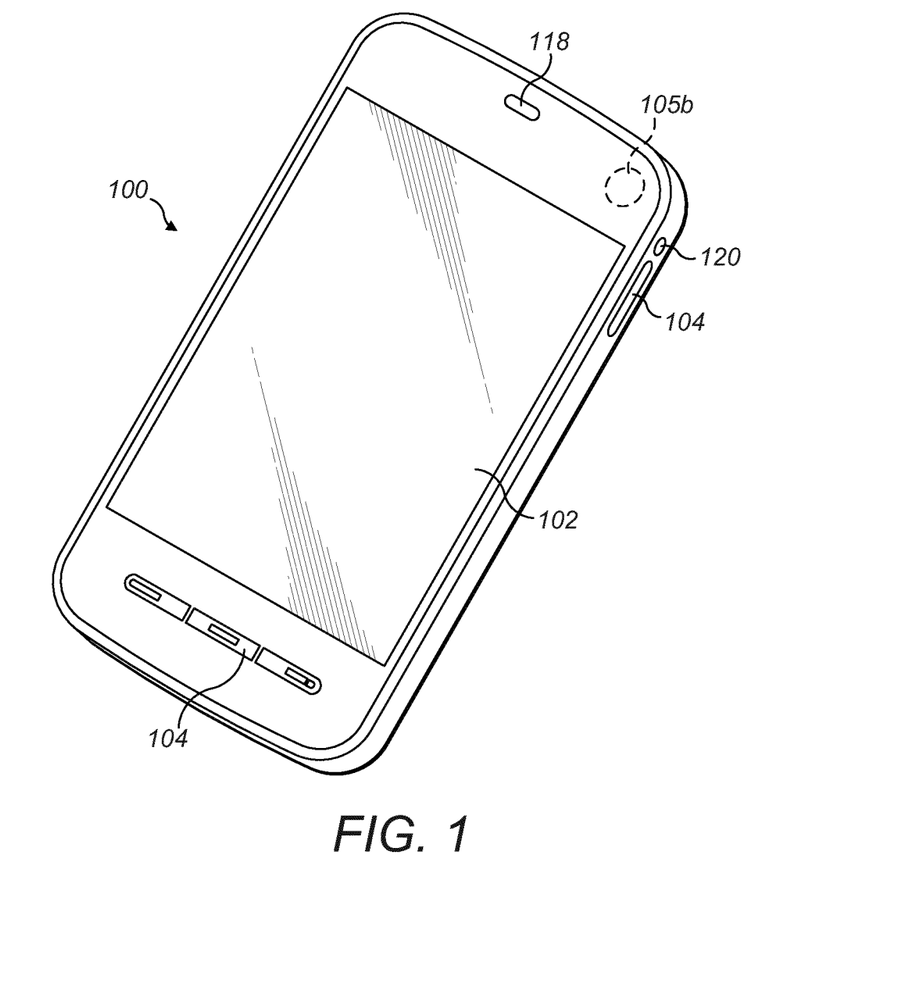
FIG. 1 is a perspective view of a mobile terminal embodying aspects of the invention.

Referring firstly to FIG. 1, a terminal 100 is shown. The exterior of the terminal 100 has a touch sensitive display 102, hardware keys 104, a rear-facing camera 105, a speaker 118 and a headphone port 120. The terminal 100 here is a monobody touchscreen smartphone, of which the Nokia N9™ is an example.

Figure 2:
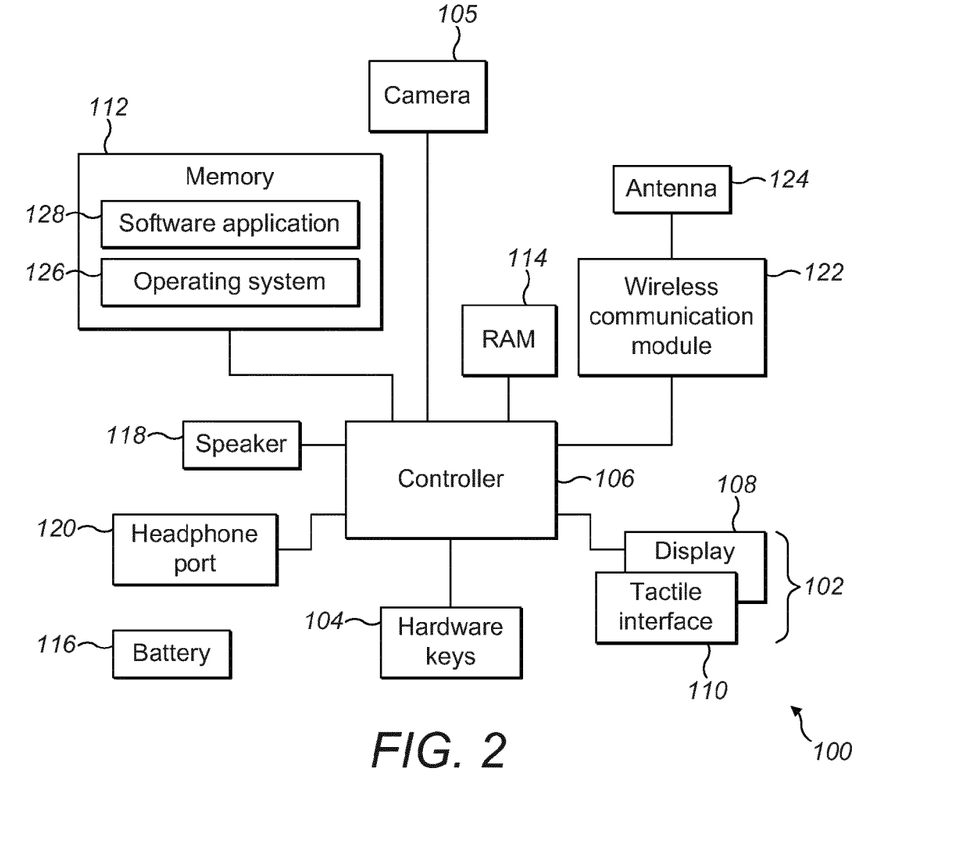
FIG. 2 is a schematic diagram illustrating components of the FIG. 1 mobile terminal and their interconnection.

FIG. 2 is a schematic diagram of the components of the terminal 100. The terminal 100 has a controller 106. The terminal 100 also has a display 102. The display 102 is a touch sensitive display 102 comprised of a display part 108 and a tactile interface part 110. The terminal 100 has hardware keys 104. The terminal 100 has a camera 105. The terminal 100 has a memory 112. The terminal 100 has RAM 114. The terminal 100 has a speaker 118. The terminal 100 has a headphone port 120. The terminal 100 has a wireless communication module 122. The terminal 100 has an antenna 124, The terminal 100 has a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores an operating system 126. The operating system 126 includes a kernel and plural modules (not shown). The operating system for instance be the Symbian™ operating system provided by the Symbian Foundation or the Windows Phone™ operating system provided by Microsoft Corporation. The memory 112 also stores one or more software applications 128. The RAM 114 is used by the controller 106 for the temporary storage of data. The operating system 126 may contain code which, when executed by the controller 106 in conjunction with RAM 114, controls operation of each of the hardware components of the terminal. The RAM 114 and the memory 112 may be separate memories or they may be different parts of the same memory.

The controller 106 may take any suitable form. For instance, it may be processing means comprising a microcontroller, plural microcontrollers, a single-core processor, plural processors or a multi-core processor such as a dual-core processor or a quad-core processor.

The terminal 100 may be a mobile telephone or smartphone, a personal digital assistant (PDA), a portable media player (PMP), a portable computer or any other device capable of running software applications and providing display outputs. The terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 is configured to display images and text to users of the terminal based on instructions provided by the controller 106. The tactile interface part 110 is for receiving touch inputs from users and for indicating to the controller 106 what inputs have been received.

As well as storing the operating system 126 and software applications 128, the memory 112 may also store media files such as photographs, other digital images, music and video files. A wide variety of software applications 128 may be installed on the terminal including web browsers, radio and music players, games and utility applications.

Some or all of the software applications stored on the terminal may provide audio outputs. The audio provided by the applications may be converted into sound by the speaker(s) 118 of the terminal. If headphones or speakers have been connected to the headphone port 120, sound may be converted by the headphones or speakers connected to the headphone port 120.

In some embodiments the terminal 100 may also be associated with external software applications not stored on the terminal. These may be applications stored on a remote server device and may run partly or exclusively on the remote server device. These applications can be termed cloud-hosted applications. The terminal 100 may be in communication with the remote server device in order to utilise the software applications stored there.

The hardware keys 104 may include a camera operation key. The camera operation key may trigger the capture of photographs using the camera 105. The camera operation key may also cause a camera application, being one of the software applications 128, to be opened or executed. In this way, a user can prepare the device 100 to capture photographs or video simply by activating the camera operation key. Activation of the camera application may require a long press or hold of the camera operation key. The camera operation key may be configured to focus the camera 105 when the key is held by the user half-depressed.

In some embodiments, the hardware keys 104 include dedicated volume control keys or switches. The hardware keys may for example comprise two adjacent keys, a single rocker switch or a rotary dial. The hardware keys 104 may be located on the side of the terminal 100.

Briefly, the terminal 100 displays name bubbles indicating the names of people present in displayed images.

Figure 3:
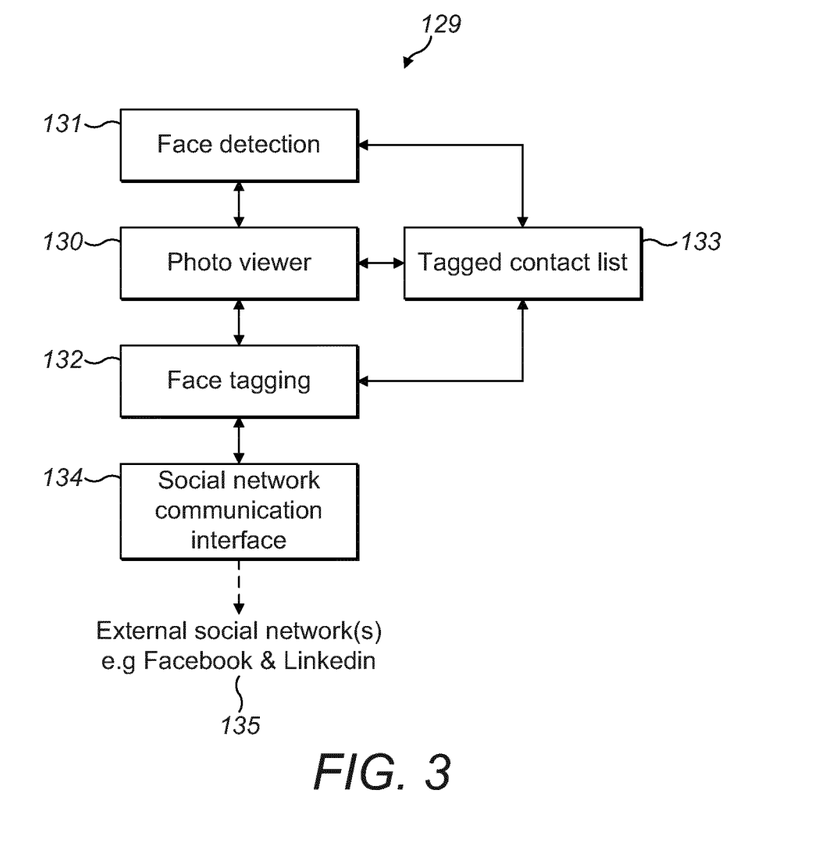
FIG. 3 is a schematic diagram illustrating functional components of a name bubble creating/generating and displaying feature provides by the FIG. 1 mobile terminal.

Referring to FIG. 3, there are shown various software modules which are stored on the memory 112 and together provide for displaying name bubbles on images. Each will be briefly described.

A photo viewer application 130 enables the user to open and organise photos and other digital images stored in the memory 112. Digital images may be sourced in any suitable way. Digital images may be captured by the camera 105. Alternatively, they may be received as image files, for instance as an attachment or embedded within a message such as an email, an instant message, a multimedia message service (MMS) message or a message provided through a social network service provider such as Facebook or LinkedIn. Images may instead be hosted remotely. For instance, images may be photos that are held within a user's gallery on a service such as Ovi, Facebook or Flickr.

A face detection module 131 operates in conjunction with the photo viewer 130 to automatically detect faces within images, including photographs, when opened for viewing. A face tagging module 132 provides metadata for each detected face. This process is generally known as tagging, with metadata being referred to as a tag. When certain conditions are present, the face tagging module 132 prompts the user to identify a person associated with the face. Identifying the person may include identifying a record in a contact list 133. It may alternatively or additionally involve the user providing a name for the person and/or a social network presence for the person.

Optionally, the face detection module 131 can identify correlations between photos and suggest tag information to be applied to untagged photos.

The contact list 133 is a database of information relating to contacts. The contact list 133 may be referred to as an address book. The contact list 133 may include any tag data entered by the user. This can include, in addition to the metadata, a reference to the associated image and the detected face rectangles. The contact list 133 also includes details of any social networks with which contacts may be registered and the contacts' usernames for the social networks. The terminal 100 therefore maintains a locally-stored list of contacts which identifies contact names, images the contacts are shown in, and their social network presence and identities.

The social network communications interface 134 (hereafter "interface") is configured to communicate with one or more external social network applications in which the user of the terminal 100 has a presence. For this purpose, the interface 134 stores username and password information for the user enabling automatic logging-in to the or each social network application. Data communications takes place in any suitable manner, e.g. using Wi-Fi, 3G, GPRS and so on. The social network communications interface 134 may utilise APIs for the social network services with which communication is made.

A method of operation of the device 100 will now be described with reference to the flow chart of FIG. 4. The steps of this figure are performed by the one or more software applications 128, and some steps are performed by ones of the modules shown in FIG. 3.

The operation of FIG. 4 will be described with some reference to FIGS. 5*a* to 5*e*, and afterwards FIGS. 5*a* to 5*e* will be described with reference to FIG. 4.

Figure 5A:
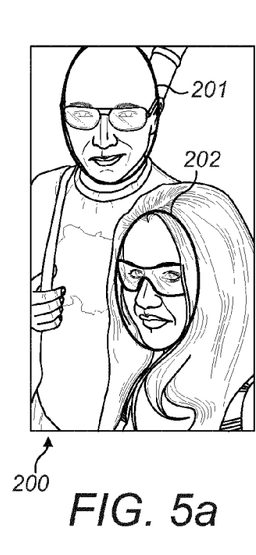
FIGS. 5a to 5e are screenshots provided by the mobile device of FIGS. 1 and 2 at different points in the operation of the flowchart of FIG. 4.

The operation starts with a photo, for instance the photo shown in the screenshot 200 of FIG. 5*a*. The photo includes at least one face, and in the example shown in FIG. 5*a* there are two faces present in the photo.

At step S1, a face is detected. This may be performed in any suitable way. The detected face may be identified in any suitable manner. For instance, an oval shape may be placed over the outline of the face. The oval shape has a length and a width dimension. Typically the length dimension is vertical in the image, for a person whose face is upright, although it may detect some other orientation.

At step S2, the face detection module 131 determines the contact whose face was detected in step S1. Step S2 also involves determining the contact's name. This is achieved using the contact list 133. Face S2 involves facial recognition, and can be achieved in any suitable way.

At step S3, a zoom level is detected. The zoom level indicates a level at which a user of the device 100 has zoomed the image that is being processed. In this illustration, a zoom level can take a value between 1, indicating a full image, to 20, indicating a 20× zoom, although this is merely an example. Determination of the zoom level in step S3 is performed by detecting a parameter of the photo viewer application or module 130.

At step S4, a face size attribute is determined. The face size attribute is an indication of the size of the face in the image. The face size attribute may for instance be the sum or average of the length and width of the oval shape that was generated to coincide with the outline of the face. The attribute may instead be the height of the face, which is provided by the height of the oval.

Ovals are shown at 201 and 202 in the screenshot 200 of FIG. 5*a*. In this example, it can be seen that, although the heights of the faces are approximately equal, the oval of the male face shown at 201 is wider than the oval of the female face shown at 202, because the female face is relatively oblique compared to the male face, which is relatively face-on.

At step S5, a maximum bubble length is determined. The maximum bubble length is a maximum length for a name bubble that is to be displayed in connection with the face that is being processed. The length here is the dimension in the horizontal direction. As is described below, the maximum bubble length is used to determine what name or part of a name of the contact relating to the face is included in the name bubble. The maximum bubble length is determined having regard to the face size attribute determined in step S4. In particular, the maximum bubble length is a function of the face size attribute. The function may be a linear function or it may be more complicated. For instance, the maximum bubble length may be set as a multiple of (for instance one eighth of) the average of the height and width measurements of the oval relating to the face. It may alternatively be set as a multiple of (for instance one half of) the square of the average of the height and width measurements of the oval relating to the face. Other suitable functions will be apparent to the skilled person.

The maximum bubble length determined at step S5 is dependent on the zoom level detected at step S3. This may be achieved in one of two main ways. In one alternative, the maximum bubble length is calculated as a function also of zoom level, with the face size attribute being an absolute attribute, for instance measured in terms of pixels of the original image. Alternatively, the face size attribute is dependent on the zoom level, for instance as measured in number of pixels for display, rather than number of pixels in the original image. In this alternative, the maximum bubble length is calculated having regard to the face size attribute but without having regard to the zoom level, because the zoom level is already accommodated in the determination of the face size attribute.

Following determination of the maximum bubble length at step S5, a part of the name of the contact whose face is being processed is selected for inclusion in the name bubble. Step S6 involves a number of sub-steps, as follows.

Firstly, at step S6.1, it is determined whether the full name of the contact would fit within a name bubble having the maximum bubble length determined at step S5. This step is performed by determining a text size at which the name is to be provided within the name bubble and determining whether the full name of the contact at that text size has a length that is less than or equal to the maximum bubble length. Step S6.1 takes into account the particular font in which the name is to be provided in the name bubble, the particular letter combinations within the name and the spaces that may be provided between different words of the name. Except in the case of using a font with regular character width, such as courier, the length of the name will typically not be a simple function of the number of characters in the name.

If it is determined at step S6.1 that the full name would fit within the name bubble, at step S6.2 the full name of the contact is selected. In the event of a negative determination at step S6.1, at step S6.3 it is determined whether the first name or names of the contact would fit within the name bubble. This involves separating out the first name or first names of the full or whole name of the contact from the family name or names for the contact, which may be performed in any suitable way. Typically, first names are included in different fields to family names in records included in the contact list 133, and in this case step S6.3 involves determining the first name or names from the relevant field of the relevant record of the contact list 133. If all of the names of a contact are included in a single field within the contact list 133, then step S6.3 involves (quasi-)intelligently determining which of multiple words of the name are the first name or names. This can be performed in any suitable way, for instance by detecting hyphens in between words of the name and grouping words that are separated by a hyphen in the same part, for instance, first name part of family name part, of the name.

If step S6.3 shows that the first name or names would fit within the name bubble, the first name or names is or are selected at step S6.4. In the event of step S6.3 revealing that the first name or names would not fit within the name bubble, at step S6.5 the initials of the name are selected.

Following step S6, the bubble colour is set at step S7. Step S7 also involves setting the location of the name bubble.

The colour of the name bubble is set based on a determination as to whether the contact's name has or has not been confirmed by the user of the terminal 100. In these examples, a light, e.g. white, colour is selected for names for contacts that have not been confirmed by the user. A dark colour, for instance black, is selected for bubbles for which the name has been confirmed by the user of the terminal 100. Bubble location may be set in any suitable way. For instance, the bubble location may be set at a default location, and may be moved only if it is determined to be appropriate to move the name bubble. For instance, the default location could be the uppermost end or part of the oval that overlays the user's face. In this way, the display of the name bubble on the image does not obscure the key features of the contact's face, particularly the mouth, nose and eyes. It can be determined that this location is not appropriate if, for instance, the display of the name bubble at that location would result in some or all of it overlapping with an edge of the image or overlapping with a screen element that is provided along with or overlaying the image. When it is detected that the default location is not appropriate, the name bubble is set to the nearest location that would not overlap with an edge of the image or a screen element. Moving the location may comprise a move to a location where there would not be any overlap with an edge of the image or any screen elements. Setting the location of the name bubble in step S7 may involve ensuring a minimum separation between the name bubble and an edge of the image or screen elements. The minimum separation may be small, for instance approximately one tenth of a height of the name bubble.

At step S8, the selected name text is displayed in a name bubble that is overlaid onto the image. For instance, as shown in FIG. 5b, a name bubble 203 is shown overlaid on the oval 201 corresponding to the male face in the image. Also, a second name bubble 204 is shown in relation to the oval 202 relating to the face of the female contact shown in the image. Step S8 involves displaying the name bubble with a predetermined height. In this example, the height of the bubble is the same regardless of all other parameters. The length of the name bubble is set to the minimum length that accommodates the name or part of the name that was selected at step S6 to be included in the name bubble. The length of the name bubble may be less than the maximum bubble length determined in step S5. Unless the length of the name or the part of the name that was selected at step S6 is exactly equal to the maximum bubble length determined at step S5, the length of the name bubble displayed in step S8 will be less than the maximum bubble length determined in step S5.

At step S9, it is determined whether there is another face in the image to be processed. In the event of a positive determination, the operation proceeds again to step S1, where the second face is detected. Steps S2 to S8 are then performed for the second face.

If at step S9 it is determined that there are no further faces to be processed within the image, it is determined at step S10 whether the zoom level has changed. If the zoom level has changed, the operation proceeds again to step S3, where the new zoom level is detected, and the operation proceeds as described above. If it is detected at step S10 that the zoom level has not changed, the operation proceeds to step S11. Here, it is determined whether it is required to exit the operation. In the event of a negative determination, the operation proceeds again to step S10, where it is determined whether the zoom level has changed. If at any performance of step S11 it is determined that it is required to exit, the operation is exited at step S12.

Having regard to the above, it will be appreciated that the maximum bubble length varies depending on the zoom level. Since the part of the name that is selected to be displayed in the name bubble is dependent on the maximum bubble length, the part of the name that is displayed is dependent also on the zoom level. This will now be explained in more detail with reference to FIGS. 5a to 5e.

FIGS. 5a to 5e are screenshots representing different stages of operation of the terminal 100.

In the screenshot 200 of FIG. 5a, an image is displayed. The image occupies the whole of the display 102.

FIG. 5a shows that a male face has been detected and the outline of the face is shown by the oval at 201. Additionally, a female face has been detected and is shown by an oval at 202.

FIG. 5b shows a screenshot 207 that is provided by the terminal 100. This screenshot 207 of FIG. 5b is provided for instance when a user input, for instance a short press, is received when the screenshot 200 of FIG. 5a is shown. In the screenshot 207 of FIG. 5b, the image from FIG. 5a is the same, although there are some screen elements that are overlaid thereon. In particular, a first name bubble 203 is overlaid on the male face that is defined by the oval 201. A second name bubble 204 is overlaid onto the female face that is represented by the oval 202. Additionally, a toolbar 206 is shown at the bottom of the screenshot 207.

The toolbar 206 extends across the width of the display 102. The toolbar 206 extends a small height from the bottom of the screenshot 207. The toolbar includes a number of icons. Each icon can be selected by a user of the terminal 100 to cause performance of a different function. In the example shown in screenshot 207, one icon indicates a back function. A second icon indicates a share function. A third icon indicates a favourites function. A fourth icon indicates a delete function. Lastly, a fifth icon indicates a list function, selection of which would open a list of selectable menu commands (insert face, slide show, edit, save as etc.)

The screenshot 207 also includes an information bar 205. The information bar 205 is provided at the top of the display 102 in the screenshot 207. The information bar 205 extends across the width of the display 102 and screenshot 207. The information bar 205 includes information about the image that is being displayed. Here, the information may include the file name. If the image is not stored locally but instead is stored remotely, the information bar 205 may include an indication of the location of the content, for instance a uniform resource locator (URL) or uniform resource indicator (URI). The information bar 205 may also include geo data, for instance a location corresponding to the image. In the case of a photograph, the geo data may indicate a location at which the photograph was captured. The information bar 205 also includes time data. For instance, the information bar 205 may include a time and date. In the case of a photograph, this may indicate the time and date at which the photograph was captured.

Figure 4:
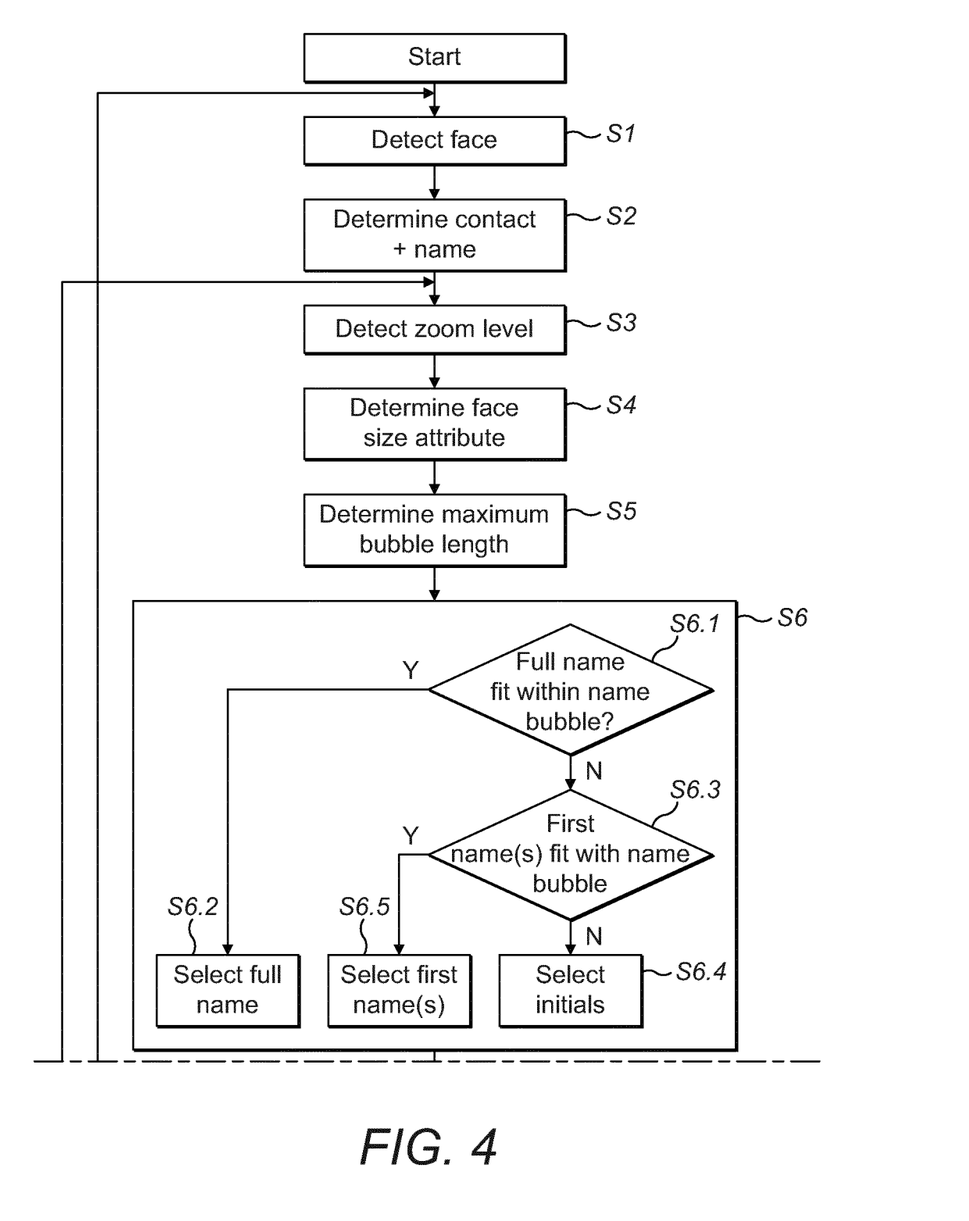
FIG. 4 is a flow diagram indicating the main functional steps performed during name bubble generation/creation and display.
Figure 5B:
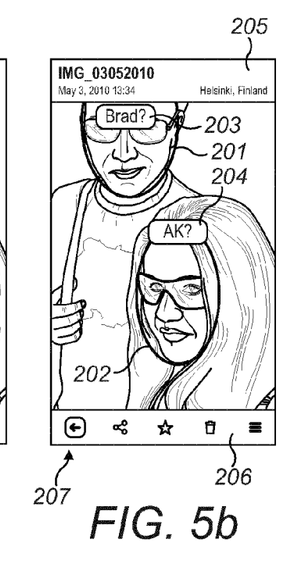

In providing the first name bubble 203, the terminal 100 performs the operation of FIG. 4. In doing so, the contact and the name of the contact was determined at step S2 as likely relating to a person with the name Brad van Houten. At step S3, no zooming was detected to be present, so a full size image was detected. At step S4, a face size attribute was detected for the oval 201 for the face of the contact Brad van Houten. Here, the face size is relatively large compared to the face 202 of the female contact within the image. The face size attribute determined at step S4 may for instance be 70 (with no units).

At step S5, the maximum bubble length was determined having regard to the face size attribute determined in step S4. For instance, the maximum bubble length was determined as 70 pixels. At step S6, a part of the name of the contact Brad van Houten was selected for display in the name bubble. In this case, step S6.1 involved determining a number of pixels that would have been required to display the whole of the name Brad van Houten. In this example, 152 pixels are required to display the name Brad van Houten in the font and the font size that are required to be used for displaying the name in the name bubble 203. As such, step S6.1 determined that the full name of the contact would not fit within the name bubble having a maximum bubble length of 70 pixels.

At step S6.3, it was calculated that to display the first name of the contact, namely Brad, would require a name bubble of length 61 pixels. This was then determined to be less than the maximum bubble length of 70 pixels that was determined in step S5. As such, step S6.3 led to the first name of the contact, Brad, being selected at step S6.4.

At step S7, the bubble colour was selected as white on the basis that step S2 involved determining the contact using facial recognition and as such confirmation by the user is required before it could be determined that the name of the contact was confirmed by the user of the terminal 100 as relating to the face included in the image.

Step S7 also involved determining that the default location for the name bubble 203 was not appropriate. This determination was made on the basis that the default location for the name bubble overlapped with the information bar 205 and also the edge of the image. As such, step S7 involved determining a location for the name bubble that is directly below the default location and separated from the lowermost edge of the information bar 205 by the minimum separation.

At step S8, the selected name text, here the first name Brad, was then displayed in the name bubble 203 at the location and with the bubble colour determined in step S7.

At step S9, it is determined that there is another face to be processed, this time the female face that is provided with the oval at 202. As such, the operation returns to step S1, where the face 202 is detected. At step S2, the contact and the name of the contact is determined, in the same was as described above in relation to Brad van Houten. In this case, the female face is identified as Amy Kang. Steps S3 to S5 are as described above with reference to Brad van Houten. However, because the oval of the face 202 for Amy Kang is smaller than the oval of the face 201 for Brad van Houten, the maximum bubble length determined in step S5 is less than the maximum bubble length determined for Brad van Houten. In particular, the maximum bubble length is set at 46 pixels, based on a face size attribute determination at step S4 of 46.

At step S6.1, it is determined that the full name of Amy Kang requires 122 pixels, and determines that this is greater than the maximum bubble length. As such, the operation proceeds to step S6.3, where it is determined whether Amy Kang's first name would fit within the name bubble. Here, it is determined that the name Amy requires 48 pixels. Since this is greater than the maximum bubble length determined at step S5, the operation proceeds to step S6.5. Here, Amy Kang's initials are selected for inclusion within the name bubble.

At step S7, the bubble colour and location are set. Here, it is determined that the default position for the name bubble, namely at the top of the oval defining the face 202, is an appropriate location for the name bubble, because it would not overlap with any screen elements. The bubble colour is set to white because the name for Amy Kang was derived by facial recognition and has not been confirmed by the user of the terminal 100.

At step S8, the selected name text of the contact's initials, AK, are displayed in the name bubble. The length of the name bubble is appropriate to the length of Amy Kang's initials, and in this case is less than the maximum bubble length.

Figure 5C:
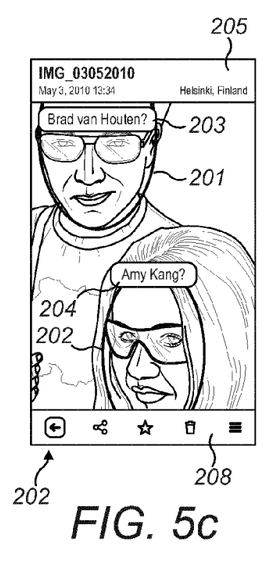

FIG. 5c shows a screenshot 208. This screenshot follows the screenshot 207 of FIG. 5b, and is provided after the user of terminal 100 has entered a "zoom" input. A zoom input may be provided by a user for instance using a pinch gesture, using one of the hardware keys 104, manipulating a slider (not shown) presented on the user interface, or in any other suitable way.

On detecting the change in zoom level at step S10, the flow chart proceeds to step S3. The processing is the same as described above with reference to FIG. 5b. However, the zoom level is greater, for instance is 1.2× or 1.3×, and as such the zoom level detected at step S3 is greater. Because the faces 201 and 202 are larger in the screenshot 208 of FIG. 5c than they are in the screenshot 207 of FIG. 5b, the face size attribute determined at step S4 is larger for each of the faces. In this example, the face size attribute determined for Brad van Houten is 170 and the face size attribute determined for Amy Kang is 143. As such, the maximum bubble length determined for Brad van Houten at step S5 is 170 pixels. Also, the maximum bubble length determined for Amy Kang at step S5 is 143 pixels.

Since the maximum bubble length for Brad van Houten is greater than the length needed to display the whole of his name, the first name bubble 203 includes the full name of Brad van Houten. Similarly, because the maximum bubble length for Amy Kang is greater than the number of pixels needed to display her whole name, the whole of her name is selected at step S6.2 and is displayed in the second name bubble 204.

The bubble colours set in step S7 are the same as described above in relation to FIG. 5b. The location of the first name bubble 203 for Brad van Houten is slightly different, and is set to the minimum spacing from the information bar 205 and is centred directly below the centre of the top of the oval 201 for his face.

Figure 5D:
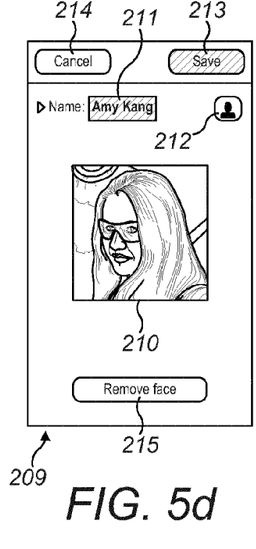
Figure 5E:
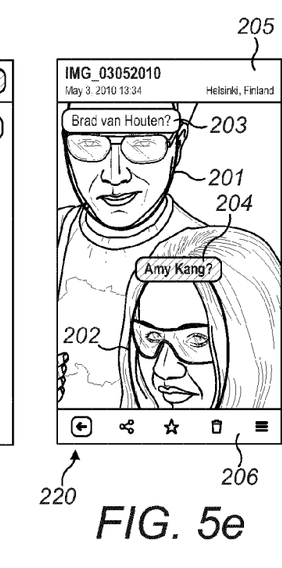

FIGS. 5d and 5e illustrate another aspect of operation of the terminal 100, not all of which is illustrated by the flow chart of FIG. 4. In particular, FIG. 5d illustrates how a user can confirm or change a name provided for a contact in a name bubble.

FIG. 5d includes a screenshot 209 illustrating a screen that is provided following a user input to the screenshot 208 of FIG. 5c at the location of the second name bubble 204, for Amy Kang. The screenshot 209 that is provided by the terminal 100 includes a number of components. These include firstly a cropped picture of the head of the person surrounding the second face 202. It also includes a number of areas that may be selected by a user. A first one of these is a field or icon 211 that includes text indicating the name that was determined at step S2 of FIG. 4, in this case Amy Kang. Also provided is an icon 212, which provides access to the contacts list 133. This icon 212 is adjacent the name field or icon 211. The user of the terminal 100 can thus confirm that the face is that of Amy Kang or can choose an alternative contact to associate with the face. In response to detecting a user input at the name field 211, the terminal 100 stores data indicating that the user has confirmed this face to be Amy Kang. It may also update face detection information in the face detection module 131. In response to detecting a user input at the contact list icon 212, the terminal 100 presents a graphical user interface for the contact list. This allows the user to select the correct contact for the face 202. On receipt of confirmation of a different contact, the terminal 100 stores data indicating that the face 202 is that of the contact input by the user. The face detection module 131 may also use this information to update its face detection records.

An icon labelled "save" is provide at the uppermost portion of the screen 209. In response to detecting user input on the "save" icon 213, the terminal 100 acts in the same way as described above with reference to receiving user input at the name field/icon 211.

The screenshot 209 also includes a "cancel" icon 214 at the uppermost part of the screen. In response to detecting a user input at the "cancel" icon 214, the terminal 100 acts to revert to the previous display, in this case to provide the screenshot at 208 of FIG. 5c.

The screenshot 209 includes towards the lower part of the screen a "remove face" icon 215. In response to detecting a user input at the "remove face" icon 215, the terminal 100 acts by untagging the face 202. In this case, the name bubble 204 is removed, preventing tagging of the face 202.

In response to detecting a user input at either the "name" icon 211 or the "save" icon 213, the terminal 100 provides a screenshot 220 as shown in FIG. 5e. Here, the screenshot 220 is the same as the screenshot 208 of FIG. 5c except that the second name bubble for Amy Kang has a dark colour. This allows a user of the terminal 100 to determine that the name for the contact having the face 202 has been confirmed, and allows the user to distinguish between names that have been confirmed and names that have not been confirmed.

Numerous alternative embodiments will be apparent to the skilled person, and all such embodiments that fall within the scope of the claims are within the scope of this invention. Some alternative embodiments will now be descried.

Although in the above name bubbles are provided for the faces as shown in FIG. 5b in response to a user input from the screenshot shown in FIG. 5a, alternatives are expressly envisaged. In some alternatives, name bubbles for faces are provided only when some zooming occurs. As such, name bubbles are not provided at full image size, but name bubbles are provided as soon as any zooming input is received from a user. In other embodiments, name bubbles are provided at any zoom level even if no user input is received. In such embodiments, name bubbles would have appeared in the screenshot 200 of FIG. 5a.

In the above-described embodiments, the height of the name bubble and the font size for the text included in the name bubbles is the same at every zoom level for which a name bubble is provided. In other embodiments, the font size may vary between different zoom levels. In some embodiments, the height of the name bubble may vary between different zoom levels.

In the above, name bubbles for names that have not been confirmed by users are provided with a white background. Another indication that the name has not been confirmed by the user is provided by the inclusion of a question mark character "?" at the end of the name or part of the name. In other embodiments, this may be omitted. If the question mark character is included, the length of the name that is determined in step S6.1 and the length of the first name that is determined in step S6.3 may include also an allowance for the inclusion of the question mark character. In these embodiments, the name displayed in a name bubble at a given zoom level may differ depending on whether the name has been confirmed by a user of the terminal. If, for instance, the length of a name is such that it is only slightly smaller than the maximum bubble length at a given zoom level, the full name may be displayed in the name bubble when the name has been confirmed but if the name has not been confirmed the requirement to include a question mark at the end of the name may mean that only the user's first name is included in the name bubble.

Although in the above the screenshots are described as being provided on the display 102, this is just an example. The screenshots may instead be projected by a projector (not shown) forming part of the terminal 100 or provided as part of a peripheral device to the terminal 100. With the use of such projection, the display 102 may be temporarily disabled, or images may be provided on the display 102 and be projected simultaneously.

Although in the embodiment described with reference to FIGS. 5a to 5e it is a bubble background colour that indicates whether or not a name has been confirmed or set by a user, this is just an example. In other embodiments, different patterns or textures may be provided. For instance, unconfirmed names may be indicated by hatched, dotted or cross-hatched backgrounds and confirmed names may be indicated by plain backgrounds to the name bubbles. Alternatively, confirmed and/or unconfirmed names may be indicated by the use of dynamic, in the sense of changing over time, name bubbles. For instance, unconfirmed names may vary in intensity, for instance pulsing brighter then darker then brighter again, whilst confirmed names are provided in static name bubbles. Alternatively, the converse notation may be used to indicate confirmed and unconfirmed names.

In still other embodiments, the name bubbles are not provided with backgrounds that are different to the background image. For instance, the name bubbles may be wholly or partly transparent, such that the name provided in the name bubble is superimposed on the image but the boundary of the name bubble is not visible or is only partly visible.

Where the name bubbles have visible or partly visible edges, their shape may take any suitable form. They may have straight sides and rounded corners, as illustrated in FIGS. 5b, 5c and 5e. Alternatively, they may have sharp corners or they may be fully rounded at the left and right ends, i.e. be provided without straight vertical lines.

It will be appreciated that the above described embodiments are purely illustrative and are not limiting on the scope of the invention. Other variations and modifications will be apparent to persons skilled in the art upon reading the present application.

For instance, although the above relates to an image such as a photograph, the features in other embodiments are applied to a video thumbnail or to a frame of video.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Advantages experienced by features of the embodiments of the invention are particularly pronounced when the invention is implemented on a pocket-sized device such as a smart phone, although the principles may be applied to larger devices such a tablet computers, laptop computers, desktop computers and suchlike. In a device with a large display, for instance, the advantages described above may be welcome where faces are relatively small in a digital photograph. For instance, in a photograph that relates to tens of people, such as for instance a school or college class or year, only a relatively small area may relate to a face of a given individual. As such, the dynamic name bubble features described above can provide viewers of the image with useful information without the name bubbles occupying too much of the area of the photograph, whilst allowing a readable font size.

The invention claimed is:

1. An apparatus comprising at least one processor and at least one memory having computer-readable code stored therein which when executed controls the at least one processor to:

determine a name relating to a face in an image;
   calculate a first maximum length attribute for a name bubble for the face at a first zoom level;

select a part of the name for inclusion in the name bubble having regard to the first maximum length attribute;

calculate a second maximum length attribute for the name bubble for the face at a second zoom level, the first and second zoom levels being different and the first and second maximum length attributes being different;

select a part of the name for inclusion in the name bubble for the face at the second zoom level having regard to the second maximum length attribute; and cause display of the image with the selected part of the name in the name bubble.

2. Apparatus as claimed in claim 1, wherein the name comprises a family name component comprising one or more whole words and a given name component comprising one or more whole words and wherein the computer-readable code when executed controls the at least one processor to select a part of the name for inclusion in the name bubble by selecting the given name component of the name for inclusion in the name bubble in response to determining that the maximum length attribute for the name bubble at a given zoom level is less than a length of the sum of the given name component and the family name component of the name and is greater than or equal to a length of the given name component of the name.

3. Apparatus as claimed in claim 1, wherein the computer-readable code when executed controls the at least one processor to select a part of the name for inclusion in the name bubble by selecting initials of the name to the exclusion of other components of the name for inclusion in the name bubble in response to determining that the maximum length attribute for the name bubble at a given zoom level is less than a length of the given name component of the name.

4. Apparatus as claimed in claim 1, wherein the computer-readable code when executed controls the at least one processor to select a part of the name for inclusion in the name bubble by selecting a whole of the name for inclusion in the name bubble in response to determining that the maximum length attribute for the name bubble at a given zoom level is greater than or equal to a length of the whole of the name.

5. Apparatus as claimed in claim 1, wherein the computer-readable code when executed controls the at least one processor to calculate a maximum length attribute for a name bubble by determining a size parameter of the face at a given zoom level and setting the maximum length attribute for that zoom level dependent on the determined size parameter.

6. Apparatus as claimed in claim 1, wherein the computer-readable code when executed controls the at least one processor to determine a first name relating to the face by using face recognition to identify a best match in a database of faces.

7. Apparatus as claimed in claim 6, wherein the computer-readable code when executed controls the at least one processor to respond to a user input selecting a name bubble by providing an interface by which a user can confirm or set a name for the face.

8. Apparatus as claimed in claim 6, wherein the computer-readable code when executed controls the at least one processor to set a visual attribute for a name bubble relating to a name that is determined by face recognition software to be a likely match to a first value and set the visual attribute for a name bubble relating to a name that is confirmed or set by a user to a second value.

9. Apparatus as claimed in claim 8, wherein the visual attribute is name bubble colour.

10. A method comprising:

determining a name relating to a face in an image;

calculating a first maximum length attribute for a name bubble for the face at a first zoom level;

selecting a part of the name for inclusion in the name bubble having regard to the first maximum length attribute;

calculating a second maximum length attribute for the name bubble for the face at a second zoom level, the first and second zoom levels being different and the first and second maximum length attributes being different;

selecting a part of the name for inclusion in the name bubble for the face at the second zoom level having regard to the second maximum length attribute; and displaying the image with the selected part of the name in the name bubble.

11. A method as claimed in claim 10, wherein the name comprises a family name component comprising one or more whole words and a given name component comprising one or more whole words and wherein selecting a part of the name for inclusion in the name bubble comprises selecting the given name component of the name for inclusion in the name bubble in response to determining that the maximum length attribute for the name bubble at a given zoom level is less than a length of the sum of the given name component and the family name component of the name and is greater than or equal to a length of the given name component of the name.

12. A method as claimed in claim 10, wherein selecting a part of the name for inclusion in the name bubble comprises selecting initials of the name to the exclusion of other components of the name for inclusion in the name bubble in response to determining that the maximum length attribute for the name bubble at a given zoom level is less than a length of the given name component of the name.

13. A method as claimed in claim 10, wherein selecting a part of the name for inclusion in the name bubble comprises selecting a whole of the name for inclusion in the name bubble in response to determining that the maximum length attribute for the name bubble at a given zoom level is greater than or equal to a length of the whole of the name.

14. A method as claimed in claim 10, wherein calculating a maximum length attribute for a name bubble comprises determining a size parameter of the face at a given zoom level and setting the maximum length attribute for that zoom level dependent on the determined size parameter.

15. A method as claimed in claim 10, wherein determining a first name relating to the face comprises using face recognition to identify a best match in a database of faces.

16. A method as claimed in claim 15, comprising responding to a user input selecting a name bubble by providing an interface by which a user can confirm or set a name for the face.

17. A method as claimed in claim 15, comprising setting a visual attribute for a name bubble relating to a name that is determined by face recognition software to be a likely match to a first value and setting the visual attribute for a name bubble relating to a name that is confirmed or set by a user to a second value.

18. A method as claimed in claim 17, wherein the visual attribute is name bubble colour.

19. A non-transitory computer-readable storage medium having stored thereon computer-readable code, which, when executed by a computing apparatus, causes the computing apparatus to perform:

determining a name relating to a face in an image;

calculating a first maximum length attribute for a name bubble for the face at a first zoom level;

selecting a part of the name for inclusion in the name bubble having regard to the first maximum length attribute;

calculating a second maximum length attribute for the name bubble for the face at a second zoom level, the first and second zoom levels being different and the first and second maximum length attributes being different;

selecting a part of the name for inclusion in the name bubble for the face at the second zoom level having regard to the second maximum length attribute; and displaying the image with the selected part of the name in the name bubble.

\* \* \* \* \*